(12) United States Patent
Ruchet (10) Patent No.: US 10,753,434 B2
(45) Date of Patent: Aug. 25, 2020

(54) CHAIN TENSIONER, MACHINE FOR PROCESSING ELEMENTS IN THE FORM OF SHEETS AND METHOD FOR TENSIONING THE CHAIN SETS

(71) Applicant: BOBST MEX SA, Mex (CH)

(72) Inventor: Christophe Ruchet, Préverenges (CH)

(73) Assignee: BOBST MEX SA (CH)

( * ) Notice: Subject to any disclaimer, the term of this patent is extended or adjusted under 35 U.S.C. 154(b) by 174 days.

(21) Appl. No.: 16/080,695

(22) PCT Filed: Mar. 9, 2017

(86) PCT No.: PCT/EP2017/025044
§ 371 (c)(1),
(2) Date: Aug. 29, 2018

(87) PCT Pub. No.: WO2017/153055
PCT Pub. Date: Sep. 14, 2017

(65) Prior Publication Data
US 2019/0063563 A1 Feb. 28, 2019

(30) Foreign Application Priority Data
Mar. 9, 2016 (EP) ..................................... 16020071

(51) Int. Cl.
*B65H 29/04* (2006.01)
*F16H 7/14* (2006.01)
(Continued)

(52) U.S. Cl.
CPC ........... *F16H 7/0838* (2013.01); *B65G 23/44* (2013.01); *B65H 29/044* (2013.01); *F16H 7/06* (2013.01);
(Continued)

(58) Field of Classification Search
CPC ........ B65G 24/44; B65G 15/00; B65H 29/04; B65H 29/044; B65H 2404/30; B41F 1/28;
(Continued)

(56) References Cited

U.S. PATENT DOCUMENTS 2,949,297 A   8/1960 Bobst
3,405,937 A * 10/1968 Schoch .................. B26D 7/015
                                                        271/206
(Continued)

FOREIGN PATENT DOCUMENTS

DE       37 23 039 A1    5/1988
EP         1679188    *  7/2006    ............. B65G 23/44
(Continued)

OTHER PUBLICATIONS

International Search Report dated May 23, 2017 in corresponding PCT International Application No. PCT/EP2017/025044.
(Continued)

*Primary Examiner* — James R Bidwell
(74) *Attorney, Agent, or Firm* — Ostrolenk Faber LLP (57) ABSTRACT

A chain tensioner (50; 500) for a conveying device (70) of a machine (1; 1') for processing elements in the form of sheets (10), the conveying device (70) includes two lateral chain sets connected to the ends of transverse gripper bars (75) able to grasp the elements (10) and at least one chain-guiding device (90) configured to guide a respective chain set (80); the chain tensioner (50; 500) includes: an actuator (9) controlled by a control unit (8), a movable support (11), a transmission element (12) borne by the movable support (11), a rotary element (13) rotated by the actuator (9) and cooperating with the transmission element (12) in order to exert a thrust force on the movable support (11), the rotary element (13) being rotatable, to adjust the tension of the chain set (80). The actuator (9) is controlled
(Continued)

in synchronism with the machine angle (MA). A machine (1; 1') for processing elements and a method for tensioning the chain sets (80) of the conveying device (70) are disclosed.

19 Claims, 7 Drawing Sheets

(51) Int. Cl.
  *B65G 23/44* (2006.01)
  *F16H 7/06* (2006.01)
  *B26F 1/40* (2006.01)
  *B26D 7/18* (2006.01)
  *F16H 7/08* (2006.01)

(52) U.S. Cl.
  CPC ............... *F16H 7/14* (2013.01); *B26D 7/18* (2013.01); *B26F 1/40* (2013.01); *B65H 2403/512* (2013.01); *B65H 2403/532* (2013.01); *B65H 2404/341* (2013.01); *B65H 2701/1762* (2013.01); *B65H 2701/1764* (2013.01); *B65H 2801/42* (2013.01); *F16H 2007/0806* (2013.01); *F16H 2007/0893* (2013.01)

(58) Field of Classification Search
  CPC ........ B41F 21/04; B41F 21/08; F16H 7/0838; F16H 7/06; B26F 1/40
  USPC ........................................................ 198/813
  See application file for complete search history.

(56) References Cited

U.S. PATENT DOCUMENTS

| | | | | |
|---|---|---|---|---|
| 4,026,199 A | * | 5/1977 | Adams | B26D 1/085 493/342 |
| 4,270,906 A | * | 6/1981 | Kraft | F02B 67/06 198/813 |
| 4,421,228 A | * | 12/1983 | Marsiglio | B65G 23/44 198/814 |
| 5,895,332 A | * | 4/1999 | Olson | B65G 23/44 198/813 |
| 6,439,377 B1 | * | 8/2002 | Ellis | B65G 23/44 198/813 |
| 8,346,140 B2 | * | 1/2013 | Yasumoto | G03G 15/0131 399/302 |
| 2002/0101028 A1 | * | 8/2002 | Chiari | B65H 29/044 271/198 |
| 2013/0187333 A1 | * | 7/2013 | Cuennet | B65H 29/04 271/264 |
| 2014/0144759 A1 | * | 5/2014 | Kawanami | G03G 15/0189 198/813 |

FOREIGN PATENT DOCUMENTS

| | | | | |
|---|---|---|---|---|
| FR | 2179386 | * | 11/1973 | ............ B65G 23/44 |
| JP | 2011-140972 A | | 7/2011 | |
| WO | WO 97/45346 | * | 12/1997 | ............ B65G 23/44 |
| WO | WO 2012/038035 A1 | | 3/2012 | |

OTHER PUBLICATIONS

Written Opinion dated May 23, 2017 in corresponding PCT International Application No. PCT/EP2017/025044.

* cited by examiner

CHAIN TENSIONER, MACHINE FOR PROCESSING ELEMENTS IN THE FORM OF SHEETS AND METHOD FOR TENSIONING THE CHAIN SETS

CROSS-REFERENCE TO RELATED APPLICATIONS

The present application is a 35 U.S.C. §§ 371 national phase conversion of PCT/EP2017/025044, filed Mar. 9, 2017, which claims priority of European Patent Application No. 16020071.3, filed Mar. 9, 2016, the contents of which are incorporated by reference herein. The PCT International Application was published in the French language.

The present invention relates to a chain tensioner for a conveying device of a machine for processing elements in the form of sheets, to a machine for processing elements in the form of sheets and to a method for tensioning the chain sets of the conveying device.

TECHNICAL BACKGROUND

A machine for processing elements in the form of sheets, for example sheets of paper or of cardboard for the manufacture of packagings, comprises a succession of workstations for converting the sheets, in particular by means of a platen press. Since this type of machine is automated, conveying means are provided for bringing each sheet successively into each of the workstations. In practice, this usually comprises a series of transverse bars provided with grippers. These transverse bars, commonly referred to as gripper bars, each in turn grasp a sheet at its front edge before pulling it successively into the various workstations of the machine. Each end of each gripper bar is connected respectively to a lateral chain. The chain is formed into a loop, commonly referred to as a chain set. By virtue of a movement transmitted to the chain sets, all of the gripper bars start from a stopped position, accelerate, reach a maximum speed, decelerate and then stop. This describes an acceleration and speed cycle corresponding to the transfer of a sheet from one workstation to the following workstation. Each station performs its work in synchronism with this cycle, which is commonly referred to as the machine cycle.

Vibration phenomena occur along the chain sets and disturb their dynamic behavior. In order to limit these vibration phenomena, springs are used to serve as tensioners for the chain sets. The spring applies a force to a guide device in contact with the chain. It is possible in particular for the guide device to comprise a pulley, toothed wheels or simple guides.

Due to increases in machine production rates, the gripper bars and the chain sets are subjected to increasingly high mechanical stresses and therefore have to be increasingly strong. The vibrational phenomena are also more violent, and require the use of increasingly powerful springs which exert greater tensions. This further increases the mechanical stresses on the chain sets, thereby reducing their use life and increasing the risks of breakdown or breakage. It then becomes necessary to reinforce the chain sets, and therefore increase the power of the driving and braking elements which will accelerate them and decelerate them during each cycle.

Document WO2012/038035 describes an improved chain tensioner comprising at least one driving member able to generate a variable force with an intensity that is a function of the instantaneous production rate of the machine, the variable force being applied to at least one of the chain-guiding devices. This dynamic tensioner thus adapts the force applied to the guiding device permanently as a function of the machine angle and the production rate of the machine. As vibrations along the chain sets increase as a function of the production rate of the machine, the tension can therefore be adjusted accordingly. A variable thrust force in the chain sets as a function of the machine angle and the instantaneous production rate of the machine makes it possible to effectively combat the vibrational phenomena while limiting the stresses on the chain sets. This makes it possible to greatly slow down their wear and substantially increase their service life.

SUMMARY OF THE INVENTION

One of the aims of the present invention is to propose an improved dynamic chain tensioner which is more robust, more compact, less costly and/or simpler to arrange than that of the prior art in order to better control the tension of the chain sets.

Accordingly, one subject of the present invention is a chain tensioner for a conveying device of a machine for processing elements in the form of sheets. The conveying device comprises two spaced apart lateral chain sets connected to respective ends of a plurality of transverse gripper bars. The bars are able to grasp the elements in the form of sheets. At least one chain-guiding device is configured to guide a respective chain set. The chain tensioner comprises:
 an actuator configured to be controlled by a control unit of the processing machine,
 a movable support,
 a transmission element borne by the movable support,
 a rotary element configured to be rotated by the actuator and to cooperate with the transmission element in order to exert a thrust force on the movable support. The rotary element is rotatable over an angular range of less than 360° between a first extreme angular position and a second extreme angular position. The tension of the chain set is minimum for the first extreme angular position and maximum for the second extreme angular position. The actuator is controlled in synchronism with the machine angle.

The chain tensioner thus makes it possible to vary the tension of the chain sets as a function of the machine angle. This makes it possible to compensate for the vibrations of the chain sets as a function of the requirements, in particular as a function of the acceleration and deceleration phases of the chain sets. This makes it possible to greatly increase the service life of the chain sets by reducing their wear. The chain tensioner thus makes it possible to guarantee the precision of the positioning of the gripper bars throughout the machine cycle. It is additionally more robust and more compact than the belt systems of the prior art.

According to one or more features of the chain tensioner, taken alone or in combination,
 the transmission element is a cam roller mounted rotatably on the movable support and the rotary element is a cam. The cam has a cam surface configured to cooperate with the cam roller. The cam surface has a volute shape with a radius that increases between the first extreme angular position and the second extreme angular position;
 the transmission element borne by the movable support is a link. One end of the link is mounted pivotably on the movable support and the other end of the link is mounted pivotably on the rotary element;

the angular position of the rotary element is also controlled as a function of the machine production rate;

the control unit is configured to define the position of an operating angle within the angular range in order to take account of environmental parameters of the chain sets;

the actuator is configured to be controlled in terms of current;

the rotary element is in direct engagement with a drive shaft of the actuator;

an operating angle of the rotary element in which the rotary element cooperates with the transmission element over a machine cycle is greater than 0° and less than 100°, the movable support comprises a pivotable rocker configured to be articulated with the chain-guiding device, the rocker comprises:
- a bar,
- a pivot configured to be fixed to a frame of the processing machine and on which a first end of the bar is mounted,
- a ball joint configured to cooperate with the chain-guiding device and a second end of the bar,
- a head fixed to the bar, the transmission element is mounted movably in one end of the head, the movable support comprises a translationally movable carriage, the chain tensioner also comprises at least one return device configured to apply a substantially constant thrust force to the chain-guiding device.

Another subject of the invention is a machine for processing elements in the form of sheets, comprising
- a plurality of workstations,
- a conveying device for conveying each sheet successively through various workstations, the conveying device comprising:
  - a plurality of transverse gripper bars able to grasp the sheets by their front edges,
  - first and second lateral chain sets connected to the respective ends of the gripper bars,
  - at least one chain-guiding device configured to guide a respective chain set,
  - the processing machine comprises at least one chain tensioner as described above configured to tension at least one chain set.

The processing machine can comprise two chain tensioners in order to tension a respective chain set.

Yet another subject of the invention is a method for tensioning the chain sets of a conveying device of a machine for processing elements in the form of sheets by at least one chain tensioner as described above, in which the angular position of the rotary element is controlled in synchronism with the machine angle, the rotation in one direction increasing the tension of the chain set and the rotation in the opposite direction of rotation decreasing the tension of the chain set.

According to one or more features of the method, taken alone or in combination,
- a motor of the actuator is controlled in terms of current or position,
- the actuator is also controlled as a function of the machine production rate,
- the position of an operating angle within the angular range is defined in order to take account of environmental parameters of the chain sets,
- a start is made to control the angular position of the rotary element in synchronism with the machine angle only when the machine production rate is above a machine production rate threshold,
- the angular position of the rotary element is controlled in a disengaged position of the transmission element in order to apply a substantially constant thrust force of a return device only to the chain-guiding device.

BRIEF DESCRIPTION OF THE DRAWINGS

Other advantages and features will appear on reading the description of the invention and from the appended figures which represent a nonlimiting exemplary embodiment of the invention and in which:

FIG. 6c shows the elements of FIG. 6a for a first angular position of the cam, offset with respect to the position of FIG. 6a.

In these figures, identical elements bear the same reference numbers. The following embodiments are examples. Although the description refers to one or more embodiments, this does not necessarily mean that each reference concerns the same embodiment or that the features apply only to a single embodiment. Simple features of different embodiments can also be combined or interchanged to provide other embodiments.

Figure 1:
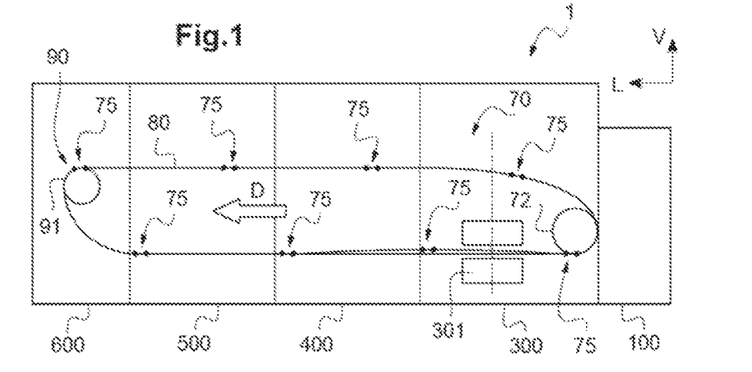
FIG. 1 illustrates in a highly schematic manner a first example of a machine for processing elements in the form of sheets.
Figure 2:
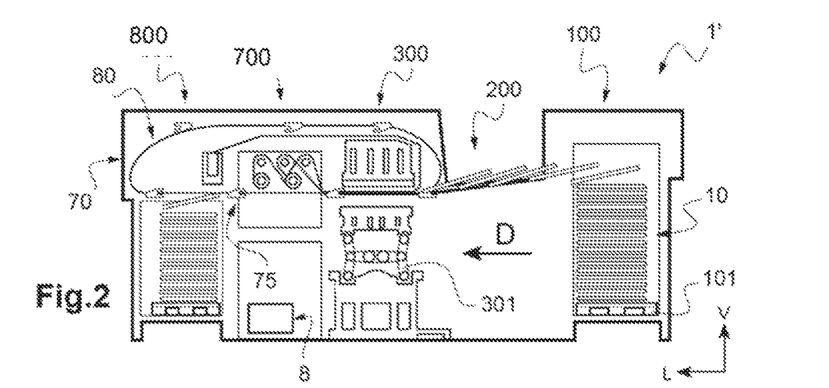
FIG. 2 illustrates in a highly schematic manner a second example of a machine for processing sheet elements.
Figure 3:
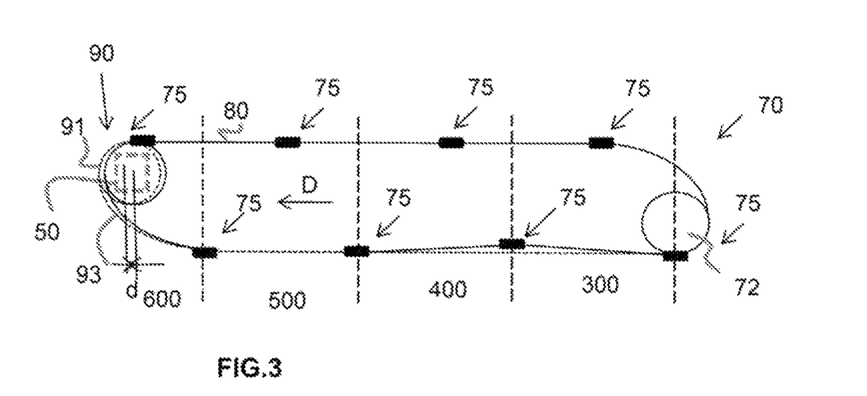
FIG. 3 is a schematic view of a conveying device of a machine for processing elements in the form of sheets.

The terms upstream and downstream are defined with reference to the direction of movement of the sheet elements 10, as illustrated by the arrow D in FIGS. 1, 2 and 3. These elements move from upstream to downstream generally following the longitudinal main axis of the machine in a movement timed by periodic steps. The term "transverse" here denotes a horizontal direction perpendicular to the longitudinal machine axis.

The terms "flat elements" and "sheets" will be considered as equivalents and will equally concern elements composed of corrugated cardboard and flat cardboard, paper or any other material commonly used in the packaging industry. It will be understood that throughout this text the terms "sheet" or "sheet element" or "element in the form of sheets" denotes in a very general manner any printing medium in the form of sheets, such as, for example, sheets of cardboard, of paper, of plastic, etc.

FIG. 1 represents a first example of a processing machine 1 for the conversion of sheets. This processing machine 1 is conventionally comprised of a plurality of workstations which are juxtaposed but interdependent on one another to form a unitary assembly. There is thus an insertion station 100, a conversion station 300, for example comprising a platen press 301, a waste ejection station 400, a blanks separation station 500 where the converted sheets 10 are reorganized into a stack and a waste removal station 600 where the cut sheet waste is removed on the fly.

The operation of converting each sheet 10 is performed in the conversion station 300, for example between a fixed platen and a lower movably mounted platen of the press 301 for diecutting the sheets with a die corresponding to the developed shape which is desired to be obtained, for example with the aim of obtaining a plurality of boxes of a given shape. The movable platen rises and falls successively once during each machine cycle.

A conveying device 70 is moreover provided for individually moving each sheet 10 from the outlet of the insertion station 100 to the waste removal station 600, passing through the press-conversion station 300.

The conveying device 70 comprises a plurality of transverse bars each provided with grippers, commonly referred to as gripper bars 75 which each in turn grasp a sheet at its front edge, before pulling it successively into and through the various workstations 300, 400, 500, 600 of the machine 1.

The ends of the gripper bars 75 are each respectively connected to a lateral chain forming a loop, commonly referred to as a chain set 80. Two chain sets 80 are thus arranged laterally on each side of the gripper bars 75.

The conveying device 70 also comprises at least one chain-guiding device 90 configured to guide a respective chain set 80.

By virtue of a movement transmitted to the chain sets 80 at driving wheels 72, all of the gripper bars 75 will start from a stopped position, accelerate, reach a maximum speed, decelerate and then stop, thus describing a cycle corresponding to the transfer of a sheet from one workstation to the following workstation. The chain sets 80 move and stop periodically such that, during each movement, all the gripper bars 75 are passed from one station to the adjacent downstream workstation. Each station performs its work in synchronism with this cycle, which is commonly referred to as the machine cycle. The workstations are in the initial position for starting a new job of work upon each start of the machine cycle. The movements, accelerations, speeds and forces are often defined by a curve corresponding to a machine cycle with an abscissa varying between from 0° to 360°. An abscissa on this type of curve is commonly referred to as the machine angle (MA).

FIG. 2 represents another example of a processing machine 1' for converting sheets, referred to as a stamping machine or hot foil stamping machine. In this example, the insertion station 100 is supplied by a pallet 101 on which a plurality of sheets 10, for example cardboard sheets, are stacked. These sheets are successively removed from the top of the stack by grippers configured to send them to a directly adjacent feed table 200. In certain machines, the sheets are removed from the bottom of the stack.

In the conversion station 300, patterns from a foil originating from one or more stamping strips from a station 700 for loading stamping strips, such as metallized strips, for example, are applied to each sheet 10 between the platens of the press 301.

It will be understood through these two examples that the number and the nature of the processing stations in a processing machine 1, 1' can vary as a function of the nature and complexity of the operations to be performed on the sheets 10. Within the context of the invention, the notion of a processing machine thus covers a very large number of embodiments on account of the modular structure of these assemblies. Depending on the number, the nature and the arrangement of the workstations used, it is possible to obtain a multitude of different processing machines. There are additionally other types of workstations than those mentioned. Finally, it the same processing machine can very well be equipped with a plurality of stations of the same type.

Elements of a conveying device 70 are schematically illustrated in FIG. 3. This figure shows a plurality of gripper bars 75, eight in the example, for moving the sheets through the various workstations 300, 400, 500, 600 of the machine 1, a chain set 80 and a chain-guiding device 90. The driving wheels 72 which drive the movement of the chain sets 80 are arranged on the opposite side to the chain-guiding devices 90, in the vicinity of the feed table 200 or of the insertion station 100.

Figure 4:
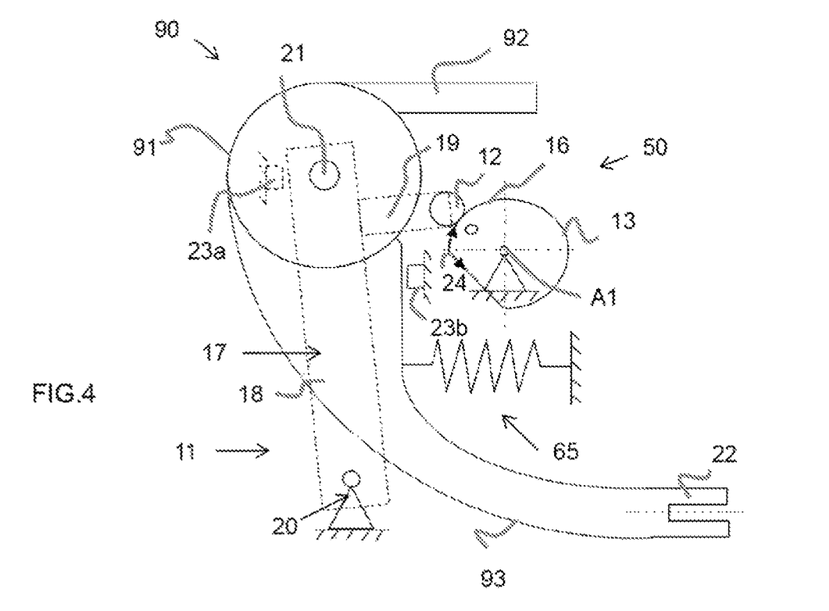
FIG. 4 shows a schematic side view of a first example of a chain tensioner mounted on a chain-guiding device.
Figure 9A:
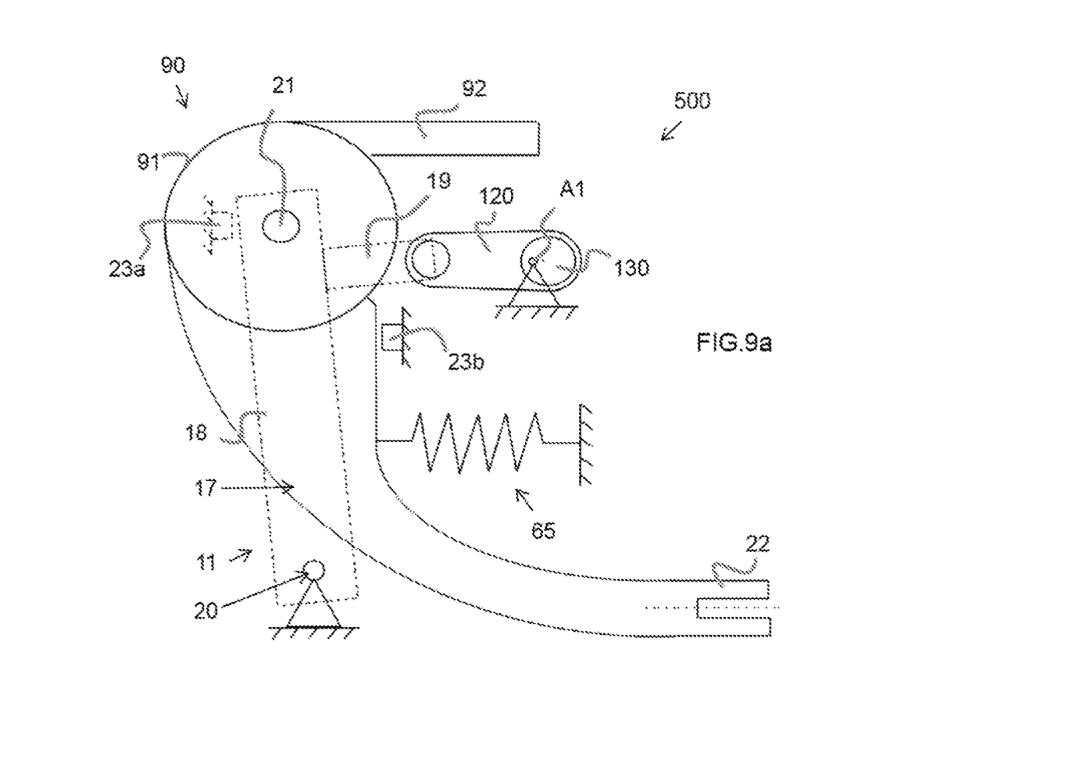
FIG. 9a shows a schematic side view of a second example of a chain tensioner mounted on a chain-guiding device.
Figure 9B:
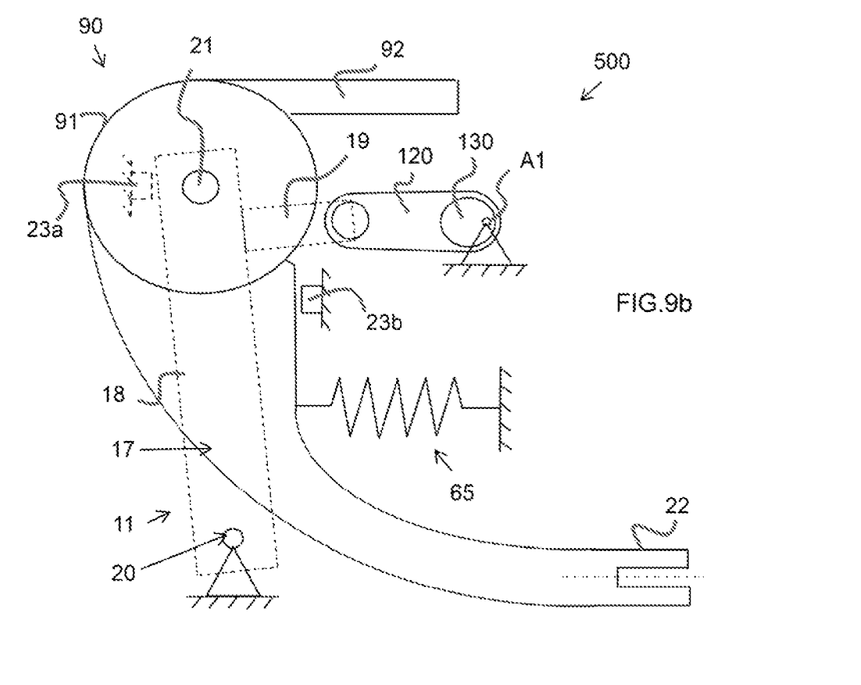
FIG. 9b shows the elements of FIG. 9a, after rotation of the rotary element, for a second angular position.

As seen in FIGS. 4 and 9, each chain-guiding device 90 comprises, for example, a pulley 91, an upper chain guide 92 arranged in a substantially horizontal manner in the machine 1 in order to guide the chain set 80 on leaving the pulley 91, and a lower chain guide 93 having a curved shape for guiding the chain set 80 over a bend of the loop toward the pulley 91. The chain-guiding devices 90 can be connected to one another by a transverse shaft 94 (see FIG. 5).

At least one chain tensioner 50; 500 is configured to apply a thrust force to a chain-guiding device 90 in order to tension the chain set 80 guided by the guiding device 90.

The processing machine 1; 1' comprises, for example, two chain tensioners 50; 500 for tensioning a respective chain set 80. That makes it possible to independently adjust the chain sets 80. Specifically, the lengths of the two chain sets 80 can be different on account of a tension or environmental parameter, such as temperature, wear or manufacturing tolerances, which are different between the sides. The two chain tensioners 50; 500 are, for example, mounted opposite on the outer sides of the chain sets 80.

This or these chain tensioner(s) 50; 500 can be placed at various locations in the processing machine 1; 1' along the path of the chain sets 80. In the example of FIG. 3, the chain tensioner 50 is situated at the waste removal station 600. In the example in FIG. 2, it is situated at the receiving station 800.

In FIGS. 4, 5, 9a and 9b, chain tensioner 50; 500 comprises an actuator 9, a movable support 11, a transmission element 12; 120 borne by the movable support 11 and a rotary element 13; 130 configured to be rotated by the actuator 9 and to cooperate with the transmission element 12; 120 in order to exert a thrust force on the movable support 11.

The rotary element 13; 130 is rotatable over an angular range α between a first extreme angular position (FIGS. 6*a*; 9*a*; 10*a*) and a second extreme angular position (FIGS. 6*d*; 9*b*; 10*b*), of less than 360°, such as less than 240°. The tension of the chain set 80 is minimum for the first extreme angular position (FIGS. 6*a*; 9*a*; 10*a*) and maximum for the second extreme angular position (FIGS. 6*d*; 9*b*; 10*b*).

The actuator 9 is configured to be controlled in synchronism with the machine angle MA, for example by a control unit 8 of the processing machine 1, in order to control the angular position of the rotary element 13; 130 in synchronism with the machine angle.

There is thus produced a variable thrust force on the chain-guiding device 90 in order to tension the chain set 80 as a function of the machine angle MA. The thrust force is reversible: a force can be applied to the transmission element 12; 120 to tension the chain set 80 by rotation of the rotary element 13; 130 driven by the actuator 9. Conversely, the rotary element 13; 130 can be turned by driving the transmission element 12; 120 on account of the return force exerted by the chain sets 80 when the actuator 9 is not actuated or when the actuation is weaker. Thus, the rotation of the rotary element 13; 130 in one direction of rotation (anticlockwise in the example) increases the tension of the chain set 80. The rotation of the rotary element 13; 130 in the opposite direction reduces the tension of the chain set (clockwise in the example). The rotary element 13; 130 can be driven alternately in clockwise or anticlockwise rotation in order to oscillate in synchronism with the machine angle MA so as to obtain the desired tension variation in the chain set 80.

The variation in the tension of the chain sets 80 as a function of the machine angle MA makes it possible to adapt the compensation of the vibrations of the chain sets 80 as a function of the requirements, and in particular as a function of the acceleration and deceleration phases of the chain sets 80. This makes it possible to limit the wear of the chain sets 80. The vibrational phenomena within the chain sets 80 vary greatly during a machine cycle. They are virtually zero when the chain sets 80 are stopped, then increase greatly when the chain sets 80 accelerate and then decrease, etc. It is therefore particularly advantageous that the thrust force generated by the chain tensioner 50; 500 varies as a function of the machine angle MA, which varies from 0° to 360° during a machine cycle.

The angular position of the rotary element 13; 130 can also be controlled by the actuator 9 as a function of the machine production rate. Specifically, the elongations of the chain sets 80 during the acceleration and deceleration phases are also dependent on the machine production rate. The variation in the thrust force exerted as a function of the machine production rate makes it possible to effectively combat the vibrational phenomena while limiting the stresses on the chain sets 80. This makes it possible to greatly slow down their wear and to substantially increase their service life.

Provision can be made to start to control the angular position of the rotary element 13; 130 in synchronism with the machine angle MA only when the machine production rate is above a machine production rate threshold, such as above 5000 s/h.

Two similar chain tensioners are provided, for example. Alternatively, a single actuator simultaneously drives two rotary elements 13; 130, wherein one actuator is formed for example by a drive shaft of the other actuator.

The support 11 can be translationally movable or be pivotable.

According to one exemplary embodiment, the movable support 11 comprises a carriage which is translationally movable with respect to the frame of the processing machine 1; 1', such as a ball-bearing carriage.

According to another exemplary embodiment, the movable support 11 comprises a rocker 17 which is pivotable with respect to the frame of the processing machine 1; 1' and articulated with the chain-guiding device 90.

For example, the rocker 17 comprises a bar 18 and a head fixed to the bar 18, the transmission element 12 being mounted rotatably in one end of the head 19. The head 19 is arranged substantially perpendicularly to the bar 18.

The rocker 17 additionally comprises a pivot 20 fixed to the frame of the processing machine 1, 1' and on which a first end of the bar 18 is pivotably mounted. The rocker 17 additionally comprises a ball joint 21 cooperating, on the one hand, with the chain-guiding device 90 at the axis of rotation of the pulley 91 and, on the other hand, with a second end of the bar 18. The ball joints 21 are, for example, fixed to the ends of the transverse shaft 94 supporting the pulleys 91, on the outer side of the pulleys 91.

Thus, a pivoting movement of the rocker 17 about the pivot 20 makes it possible to produce a virtually longitudinal movement of the chain-guiding device 90, that is of the pulleys 91 and the chain guides 92, 93. This movement can additionally be guided by planar and horizontal guide forks 22 fixed to the frame. The guide forks 22 ensure that the chain-guiding devices 90 do not pivot about the ball joints 21 but that the movement is as horizontal as possible and preferably only horizontal. Stops 23*a*, 23*b* can also be arranged set back from the chain-guiding devices 90 to block the movement travel d in the opposite direction to that of the movement of the sheets 10 in the event of a problem.

According to a first exemplary embodiment represented in FIGS. 4, 5, 6*a*, 6*b*, 6*c* and 6*d*, the transmission element is a cam roller 12 and the rotary element is a cam 13.

The cam roller 12 is mounted rotatably on the movable support 11.

The cam 13 has a cam surface 16 cooperating with the cam roller 12.

The cam surface 16 has a volute shape with a radius increase between the first extreme angular position (FIG. 6*a*) and the second extreme angular position (FIG. 6*d*).

The drive torque exerted makes it possible to ensure contact between the cam 13 and the cam roller 12. The tension in the chains 80 comes from the torque provided by the actuator 9.

The pivoting of the cam 13 over the operating angle β over a machine cycle is, for example, between 0 and 100°, such as of the order of 50°, corresponding to a longitudinal movement travel of the chain-guiding device 90 of between 0 and 10 mm, such as of the order of 5 mm.

In order to ensure the reversibility of the thrust force and to make it possible to exert a horizontal thrust force on the chain-guiding device 90 in particular with a pivoting movable support 11, the cam roller 12 cooperates with the cam 13 for example at a contact point located at the front of the cam 13 in the direction of movement of the elements in the form of sheets 10 and situated outside the horizontal plane passing through the axis of rotation A1 of the actuator 9 (FIG. 4). The contact point is therefore situated either on the upper front quarter of the cam 13 or on the lower front quarter of the cam 13. The axis passing between this contact point and the axis of rotation A1 of the actuator 9 forms, for example, an angle of about 45° with the vertical. The reversibility of the system is thus ensured. The return force created by the tension in the chains 80 can thus be capable of returning the cam 13 into its initial position and therefore of creating a torque thereon.

Figure 5:
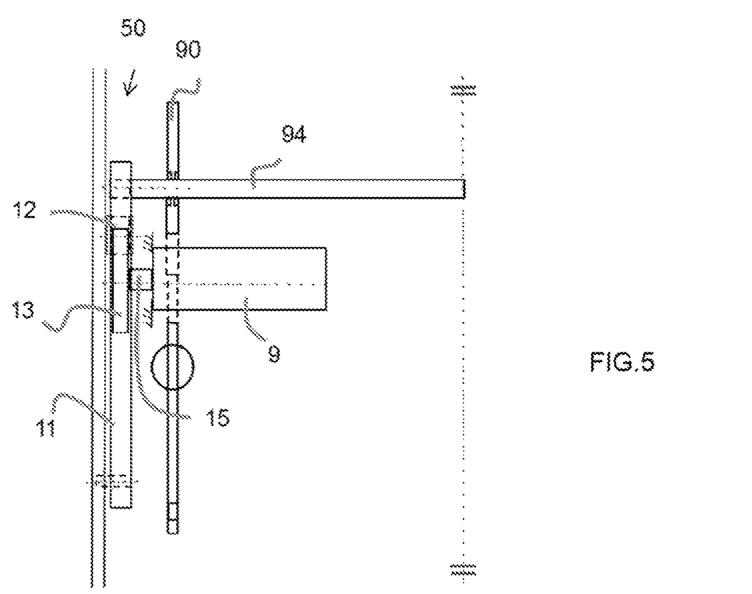
FIG. 5 shows a partial schematic view in section of the chain tensioner and of the chain-guiding device of FIG. 4.

The rotary element 13 is for example in direct engagement with a drive shaft 15 of the actuator 9, that is without reduction gear, clutch or the like between the two of them (FIG. 5). The rotary element 13 in direct engagement allows better control of its angular position. The rigidity of the system is thus also improved. Moreover, the chain tensioner 50; 500 is simpler to produce and less bulky.

The actuator 9 can be electric, pneumatic or hydraulic. It comprises, for example, a driving member which can comprise a motor 14, such as an electric motor, which can be configured to be controlled in terms of torque or position.

The motor 14 is controlled for example by applying a current setpoint allowing a torque control. When the torque setpoint is obtained by the motor 14, a balance is reached between the force exerted by the motor 14 and the tension of the chain sets 80, making is possible to ensure a tension force in the chain sets 80. This is because it is desired to control a tension of the chain sets 80. A motor controlled in terms of movement requires a measurement of the tension of the chain set 80 and a closed-loop regulation to ensure that a sufficient force is exerted in the chain sets 80. By contrast, a control in terms of current, and hence in terms of torque, is equivalent to direct control of the force applied by the motor 14 and therefore to direct control of the thrust force in the chain sets 80. Consequently, by using a motor 14 controlled in terms of current, it is no longer necessary to measure the tension of the chain set 80, and the motor 14 can have an open-loop control.

There can also be provision that the control unit 8 is configured to define the position of the operating angle β of the rotary element 13 within the angular range α in order to take account of environmental parameters of the chain sets 80. The useful portion 16 of the cam surface can thus be angularly offset to a greater or lesser extent in order to adapt the cam radius to the environmental conditions.

The environmental parameter is, for example, the temperature, the wear or the manufacturing tolerances.

Figure 6A:
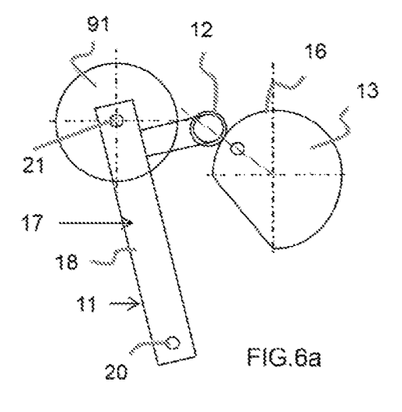
FIG. 6a shows elements of the chain tensioner of FIG. 4 for a first angular position of the cam.
Figure 6B:
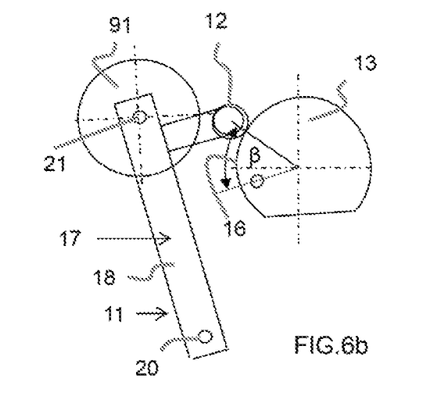
FIG. 6b shows the elements of FIG. 6a, after rotation in the anticlockwise direction of the cam, for a second angular position of the cam.
Figure 6C:
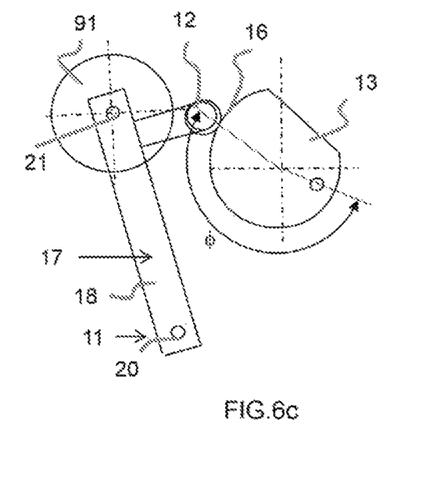
Figure 6D:
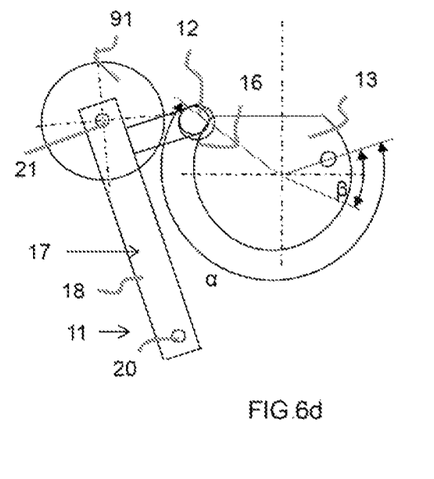
FIG. 6d shows the elements of FIG. 6c, after rotation in the anticlockwise direction of the cam in a second angular position of the cam, offset with respect to the position of FIG. 6b.

For example, with reference to FIGS. 6a, 6b, 6c and 6d, the portion 16 of the cam surface cooperating with the cam roller 12 for new chain sets 80 over the operating angle β of a machine cycle between a first position represented in FIG. 6a and a second position represented in FIG. 6b can be angularly offset as a function of the wear of the chain sets 80, the worn chain sets 80 being slacker than in the new state.

The portion 16 of the cam surface can thus be offset for example to the maximum, as represented in FIGS. 6c and 6d, with FIG. 6c corresponding to the first position, offset with respect to FIG. 6a, and FIG. 6d corresponding to the second position, offset with respect to FIG. 6b. The operating angle β is increasingly offset in step with the wear of the chain sets 80. This amounts to adding an offset of the setpoint applied to the actuator 9. In FIG. 6d, the operating angle β of the cam 13 is offset to the maximum by an angle φ (FIG. 6c), making it possible to obtain a maximum travel d for the chain-guiding device 10 of, for example, between 6 mm and 10 mm, such as of the order of 8 mm.

Optionally, and as can be seen from FIGS. 4 and 9a, the chain tensioner 50; 500 also comprises at least one return device 65 configured to apply a substantially constant thrust force to the chain-guiding device 90.

Specifically, it is always desirable to generate a minimum thrust force in the chain sets 80. This minimum force makes it possible, for example, to compensate for play due to the wear or to the expansion of the chain sets 80. Consequently, the presence of a return device 65 generating a substantially constant thrust force makes it possible to use a less powerful actuator 9 and to save on energy consumed by this actuator 9. Moreover, in the event of a breakdown of the actuator 9 or of its control circuit or in the event of a stoppage of the actuator 9, the machine 1, 1' can still be used at a reduced production rate by virtue of this minimum thrust force present in the chain sets 80.

It is also possible to control the angular position of the cam 13 in a disengaged position of the cam roller 12 in order to apply only the substantially constant thrust force of the return device 65 to the chain-guiding device 90. All that is required for that purpose is to turn the cam 13 until the roller 12 is no longer in contact therewith. It is possible for example to turn the cam 13 such that the cam 13 presents a truncated or minimum radius region 24 of the cam 13 to the roller 12 (FIG. 4).

The return device 65 comprises, for example, a spring which works in compression. A first end of the return device 65 is fixed to the chain-guiding device 90 and a second end of the return device 65 is fixed to the frame of the machine 1, 1'.

The operation of a chain tensioner 50 will now be described with reference to FIGS. 6a, 6b, 6c, 6d, 7 and 8.

Figure 7:
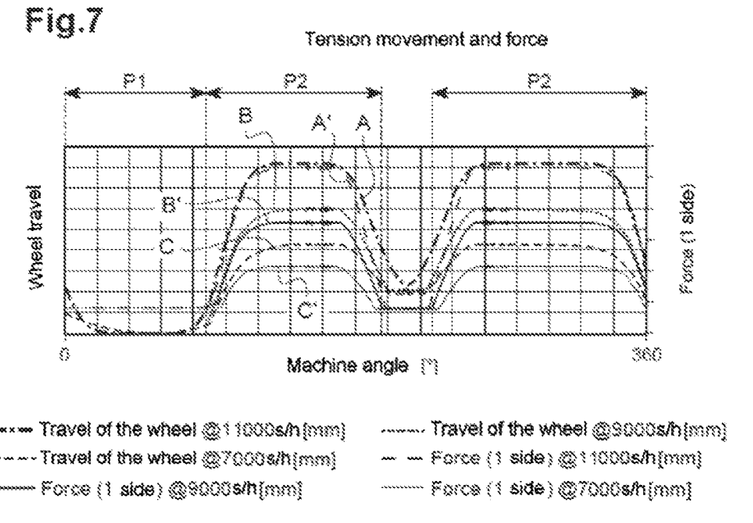
FIG. 7 is a graph showing three progressions of the movement travel of a chain-guiding device (left ordinate) for three different machine production rates (7000 s/h (for sheets/hour), 9000 s/h and 11000 s/h) and three curves (curves A', B', C') showing the corresponding progressions of the thrust force (right ordinate) during a machine cycle (the machine angle MA is therefore the abscissa which varies from 0° to 360°).

FIG. 7 is a graph showing three curves (curve A, B, C) of the progression of the movement travel d of the pulley 91 of a chain-guiding device 90 (left ordinate) for three different machine production rates and three curves (curves A', B', C') of the corresponding progression of the thrust force (right ordinate) during a machine cycle (the machine angle MA is therefore the abscissa which varies from 0° to 360°).

FIGS. 6a and 6b illustrate an example in which the cam 13 cooperates with the cam roller 12 over an operating angle β between a first angular position (FIG. 6a) and a second angular position (FIG. 6b) during a machine cycle.

In the first angular position represented in FIG. 6a, the cooperation between the cam 13 and the cam roller 12 makes it possible to apply a minimum thrust force to each chain-guiding device 90, producing, for example, a zero movement of the chain-guiding device 90 (curves A, B, C, D, phase P1).

In the second angular position represented in FIG. 6b, the chain-guiding device 90 is moved with a maximum travel d of 5 mm, making it possible to apply to the chain-guiding device 90 a maximum thrust force during the machine cycle, to each chain-guiding device 90 (phases P2 in FIG. 7).

Two main compensation phases P2 are thus observed during a machine cycle: an acceleration phase on leaving the press where the chain sets 80 accelerate to convey the elements in the form of sheets 10 to reach a maximum conveying speed, and a deceleration phase where the chain sets 80 slow down so as to stop the gripper bars 75 when the elements in the form of sheets 10 are correctly placed in the following workstation.

By controlling the actuator 9 as a function of the machine angle MA to modulate the pivoting of the cam 13, it is thus possible to control the tension of the chain sets 80 as a function of the machine angle. In this scenario, a thrust force is produced when the chain sets 80 accelerate or decelerate.

The curves B, B' show the progressions of the movement of the pulley 91 and of the thrust force exerted for a machine production rate of the order of 9000 s/h, which is less than the maximum production rate of the order of 11000 s/h of the curves A, A'. The curves C, C' are produced at a machine production rate of the order of 7000 s/h. It will be noted that, during the acceleration phase P2, the travel d and the thrust force decrease when the machine production rate decreases.

Although the figure shows two phases P2 during which a maximum thrust force is applied, other forms of movement curves are possible. For example, the two phases P2 can be of different levels and/or can be consecutive.

FIG. 7 thus illustrates the very large reduction of the stresses exerted on the chain sets 80 outside the acceleration and deceleration phases P2 and for the machine production rates which are less than the maximum machine production rate. This type of control makes it possible to greatly increase the service life of the chain sets 80 by reducing their wear. The chain tensioner 50; 500 thus makes it possible to ensure the precision of the positioning of the gripper bar 75 throughout the machine cycle. It is additionally more robust and more compact than the belt systems of the prior art.

Figure 8:
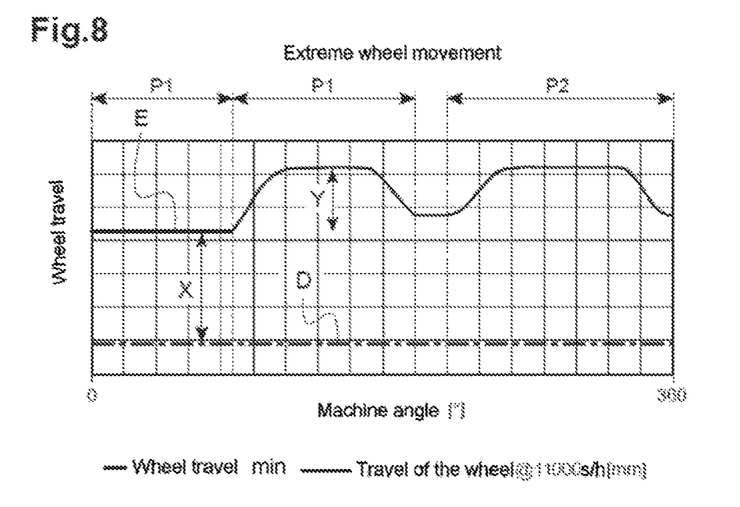
FIG. 8 is a graph showing the travel of the chain-guiding device during a machine cycle, on the one hand for a minimum machine production rate and a new chain set (curve D), and on the other hand for a maximum production rate and a worn chain set (curve E).

FIGS. 6c, 6d and the curve E of FIG. 8 illustrate an example in which the position of the operating angle β of the cam 13 within the angular range α has been offset with the wear of the chain sets 80. FIG. 8 represents movement travels of the pulley 91 as a function of the machine angle at a minimum machine production rate for new chain sets 80 (curve D) and at a maximum machine production rate for worn chain sets 80 (curve E). The curve E shows an offset X due to the wear and a "dynamic travel" Y due to the machine production rate.

In the first angular position represented in FIG. 6c, the cooperation between the cam 13 and the cam roller 12 makes it possible to move the chain-guiding device 90 with a greater minimum travel d, corresponding to an elongation of the worn chain sets 80 (offset X of the curve E in FIG. 8).

In the second angular position represented in FIG. 6d, the cam 13 has pivoted by the same operating angle β to produce the same travel d (offset X+dynamic travel Y of the curve E in FIG. 8).

The chain tensioner 50 thus makes it possible to adapt the thrust force applied to the chain-guiding device 90 as a function of the machine angle, of the machine production rate and for different machine wears.

According to a second exemplary embodiment represented in FIGS. 9a, 9b, 10a and 10b, the transmission element borne by the movable support 11 is a link 120.

One end of the link 120 is mounted pivotably on the movable support 11 and the other end of the link 120 is mounted pivotably on the rotary element 130.

In the example of FIGS. 9a, 9b, the rotary element 130 is an eccentric, the axis of rotation A1 not passing through the center. The rotary element 130 is mounted in the end of the link 120 such that the mechanical transmission is of the "crank system" type converting the rotational movement into a linear oscillation movement.

Figure 10A:
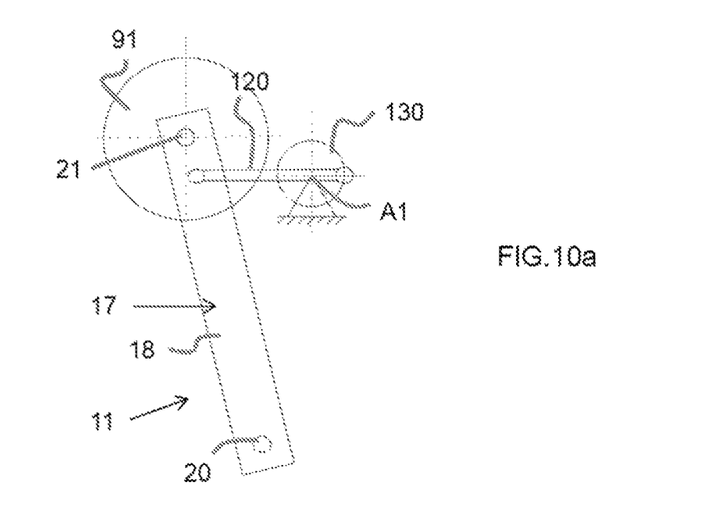
FIG. 10a shows elements of another example of a chain tensioner for a first angular position of the rotary element.
Figure 10B:
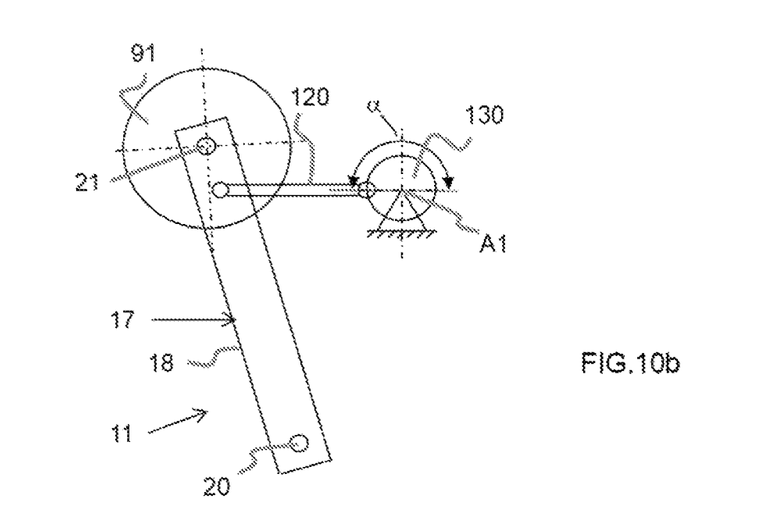
FIG. 10b shows the elements of FIG. 10a, after rotation of the rotary element, for a second angular position.

In the example of FIGS. 10a, 10b, the axis of rotation A1 of the rotary element 130 passes through the center. The end of the link 120 is mounted eccentrically on the rotary element 130, that is that it is mounted pivotably on the rotary element 130 at a point not passing through the center of the rotary element 130.

In these two examples, the rotary element 130 can be rotated by the actuator 9 in order to drive the movement of the movable support 11, the rotary element 130 being rotatable over an angular range α of less than 360° between a first extreme angular position (FIGS. 9a; 10a) and a second extreme angular position (FIGS. 9b; 10b).

The tension of the chain set 80 is minimum for the first extreme angular position (FIGS. 9a; 10a) and is maximum for the second extreme angular position (FIGS. 9b; 10b), the actuator 9 being controlled in synchronism with the machine angle MA.

The operation is the same as for the cam-cam roller system. However, with this second embodiment, it is not possible to disengage the transmission. It may, however, be possible to apply only the substantially constant thrust force of the return device 65 to the chain-guiding device 90 while leaving the actuator 9 free.

The invention claimed is:

1. A chain tensioner for a conveying device of a processing machine for processing elements in the form of sheets, the conveying device comprising:
   a plurality of transversely extending gripper bars;
   two lateral chain sets connected to respective ends of the plurality of transverse gripper bars;
   grippers on the gripper bars, the grippers being configured to grasp the elements in the form of sheets;
   at least one chain-guiding device configured to guide a respective chain set;
   the chain tensioner comprising:
   an actuator configured to be controlled by a control unit of the processing machine;
   a movable support, a transmission element borne by the movable support; and
   a rotary element configured to be rotated by the actuator and to cooperate with the transmission element in order to exert a thrust force on the movable support, the rotary element being rotatable over an angular range (α) of less than 360° between a first extreme angular position and a second extreme angular position,
   wherein a tension of the chain set is minimum for the first extreme angular position and maximum for the second extreme angular position, the actuator being controlled in synchronism with a machine angle.

2. A chain tensioner according to claim 1, wherein the transmission element comprises a cam roller mounted rotatably on the movable support,
   the rotary element comprises a cam, the cam having a cam surface configured to cooperate with a surface of the cam roller, the cam surface having a volute shape including a radius that increases between the first extreme angular position and the second extreme angular position.

3. A chain tensioner according to claim 1, wherein the transmission element borne by the movable support includes a link, the link having one end mounted pivotably on the movable support and another end mounted pivotably on the rotary element.

4. A chain tensioner according to claim 1, further comprising the angular position of the rotary element is also controlled as a function of a machine production rate.

5. A chain tensioner according to claim 1, further comprising the control unit is configured to define the position of an operating angle (β) within the angular range (α) in order to take account of environmental parameters of the chain sets.

6. A chain tensioner according to claim 1, further comprising:
   the actuator comprises a drive shaft; and
   the rotary element is in direct engagement with the drive shaft of the actuator.

7. A chain tensioner according to claim 1, wherein an operating angle (β) of the rotary element over which the rotary element cooperates with the transmission element over a machine cycle is greater than 0° and less than 100°.

8. A chain tensioner according to claim 1, wherein the movable support comprises a pivotable rocker configured to be articulated with the chain-guiding device.

9. A chain tensioner according to claim 8, wherein the pivotable rocker comprises:
a bar;
a pivot configured to be fixed to a frame of the processing machine and on which a first end of the bar is mounted,
a ball joint configured to cooperate with the chain-guiding device and with a second end of the bar; and
a head fixed to the bar, the transmission element being mounted movably in one end of the head.

10. A chain tensioner according to claim 1, wherein the movable support comprises a translationally movable carriage.

11. A chain tensioner according to claim 1, further comprising at least one return device configured to apply a substantially constant thrust force to the chain-guiding device.

12. A machine for processing elements in the form of sheets, comprising:
a plurality of machine workstations;
a conveying device for conveying each sheet successively through various workstations, the conveying device comprising:
a plurality of transverse gripper bars extending transversely to a path of the conveying device;
at least one gripper on each of the gripper bars, the grippers being configured to grasp the sheets by their front edges;
first and second lateral chain sets connected to respective ends of the gripper bars;
at least one chain-guiding device configured to guide a respective chain set; and
the processing machine comprising at least one chain tensioner according to claim 1 configured to tension at least one of the chain sets.

13. A processing machine according to claim 12, further comprising two of the chain tensioners configured to tension a respective chain set.

14. A method for tensioning chain sets of a conveying device of a machine for processing elements in the form of sheets by action of at least one chain tensioner according to claim 1, in which an angular position of the rotary element between the first extreme angular position and the second extreme angular position is controlled in synchronism with the machine angle (MA);
the method comprising:
rotating the rotary element in one direction selected for increasing the tension of the chain set, and rotating the rotary element in an opposite direction of rotation selected for decreasing the tension of the chain set.

15. A method according to claim 14, further comprising:
controlling a motor of the actuator in terms of current position.

16. A method according to claim 14, further comprising controlling the actuator as a function of the machine production rate.

17. A method according to claim 14, further comprising defining a position of an operating angle ($\alpha$) within the angular range ($\beta$) in order to take account of environmental parameters of the chain sets.

18. A method according to claim 14, further comprising starting control of the angular position of the rotary element in synchronism with the machine angle (MA) only when the machine production rate is above a machine production rate threshold.

19. A method according to claim 14, further comprising controlling the angular position of the rotary element in a disengaged position of the transmission element in order to apply a substantially constant thrust force of a return device only to the chain-guiding device.

* * * * *